Patented Oct. 21, 1952

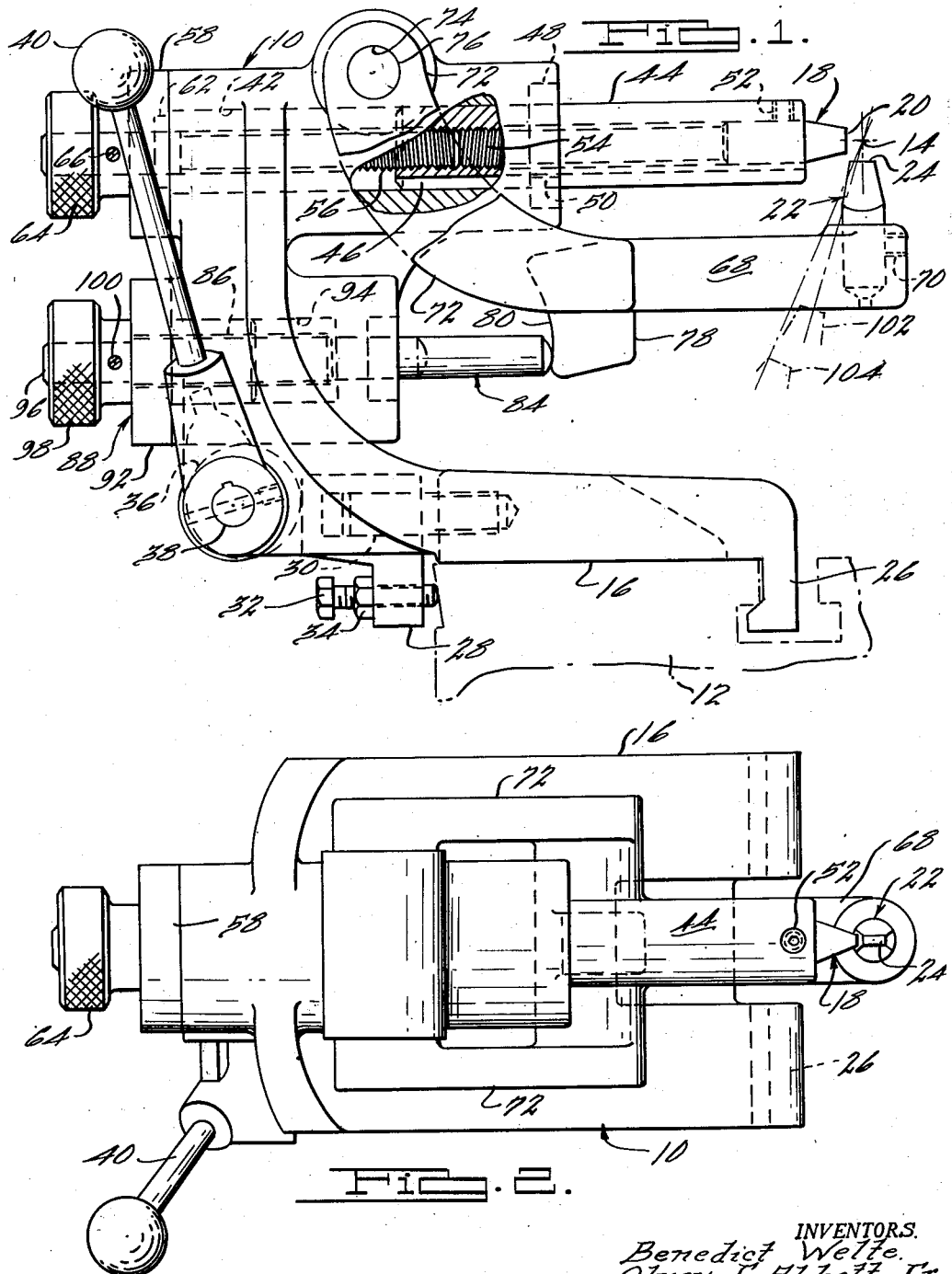

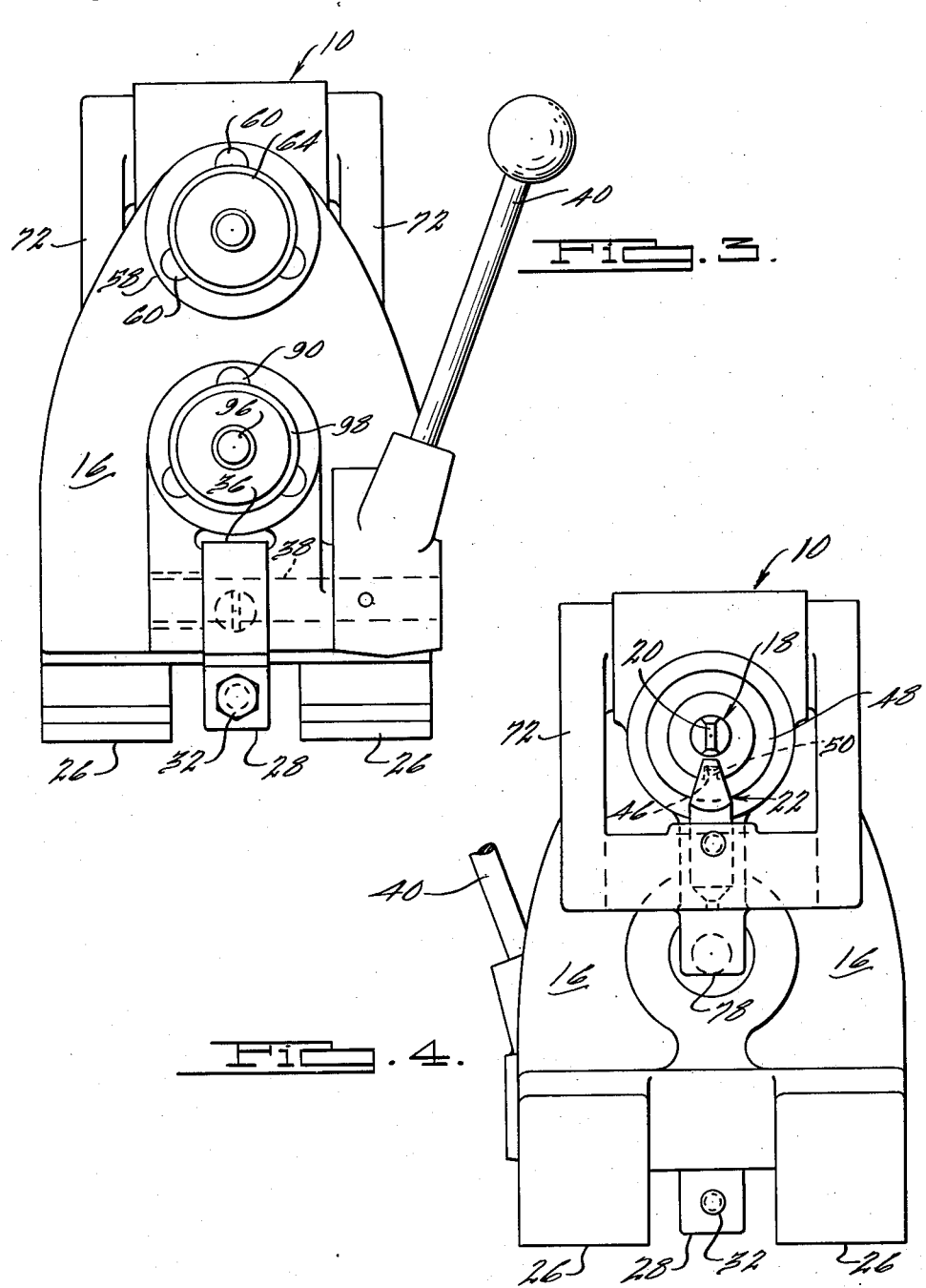

2,614,371

UNITED STATES PATENT OFFICE 2,614,371

STEADY REST

Benedict Welte, Lake Orion, and Olney J. Abbott, Jr., Detroit, Mich., assignors to Colonial Broach Company, a corporation of Delaware Application September 29, 1950, Serial No. 187,436

2 Claims. (Cl. 51—238)

The present invention relates to an improved steady rest of the type adapted to be mounted on the worktable of a machine adapted to support cylindrical workpieces of widely varying diameters for rotation about a given axis.

It is old in the art to provide steady rests for such machines, which include two surfaces adapted to engage the workpieces at points angularly spaced about the axis of rotation, each of which surfaces is formed on a separately movable element, one of which elements is mounted for straight line movement at right angles to the axis of rotation and the other of which is mounted for pivotal movement about an axis parallel to the axis of rotation. Previously known steady rests of this type have been so constructed that they had only a limited range of adjustment throughout which the working surface of the pivotally mounted element would remain tangent to a cylindrical workpiece of the diameter corresponding to its adjustment.

In some types of machines, such for example, as round broach sharpening machines, it is highly desirable to have a single steady rest which may be adjusted throughout a wide range for supporting broaches of widely differing diameters and both working surfaces of which will remain substantially tangent to a broach of the diameter for which the steady rest is adjusted.

Accordingly, it is an object of the present invention to provide an improved steady rest which is economical to manufacture, reliable and efficient in operation, and which may be adjusted for use with workpieces of widely varying diameters while maintaining both work surfaces thereof tangent to a cylindrical workpiece of the diameter for which the steady rest is adjusted.

Other and more detailed objects of the invention will be apparent from a consideration of the following specification, the appended claims, and the accompanying drawings, wherein:

Figure 1 is a side elevational view of a steady rest embodying the invention, showing parts broken away and parts in section, and showing in broken lines part of the worktable of an associated machine and also showing in broken lines an adjusted position of the jaws of the steady rest;

Figure 2 is a plan view of the structure of Figure 1;

Figure 3 is a left hand elevational view of the structure illustrated in Figure 1; and, Figure 4 is a right hand elevational view of the structure illustrated in Figure 1.

Referring to the drawings, the steady rest 10 there illustrated is adapted for use on a machine, the worktable 12 of which is illustrated in broken lines in Figure 1, and which supports an elongated workpiece (not shown) for rotation about a fixed axis indicated at 14. As mentioned above, an example of such a machine is a round broach sharpening machine. The steady rest 10 generally comprises a body 16 adapted to be secured to the worktable 12, a first jaw element 18 having a flat work engaging surface 20 and mounted on said body with the surface 20 parallel to the axis 14, the element 18 being movable in a straight line toward and away from the axis 14, and a second jaw element 22 having a flat work engaging surface 24 and mounted on the body 16 for pivotal movement throughout a wide range of adjustment while maintaining the surface 24 parallel to axis 14 and having some portion of the surface 24 at right angles to a line from the axis 14 to that portion of the surface 24.

Considering the above mentioned structure in greater detail, the body 16 is adapted to rest upon the worktable 12 and includes an integrally formed downwardly extending fixed clamping jaw 26 at its inner side, adapted to extend downwardly into a slot in the worktable, and a movable clamping jaw 28 slidably supported for movement toward and away from the fixed jaw 26 on a shank portion of a stud 30 supported on the body 16. The jaw 28 is adapted to extend downwardly along the front of the worktable and carries a screw 32 adapted to co-operate with the fixed clamp 26 to secure the steady rest to the worktable 12. The screw 32 is locked in adjusted position by a nut 34.

For urging the jaw 28 toward the jaw 26, an eccentric cam 36 is mounted on a pin 38 for rotation therewith and a handle 40 is fixed to the pin 38 for operating the cam 36. It will readily be appreciated that as the handle 40 is moved in a clockwise direction to the position illustrated, the movable jaw 28 is cammed toward the fixed jaw.

The body 16 of the steady rest 10 extends upwardly from the clamping jaws 26 and 28 and has a bore 42 extending therethrough and disposed to extend at right angles to the axis 14. In the preferred embodiment illustrated, the bore 42 is horizontally disposed. A sleeve 44 is mounted in the bore 42 for sliding movement longitudinally thereof and is provided with a slot 46 extending longitudinally thereof and disposed at its lower side. The sleeve 44 is held against rotary movement relative to the body 16 by a ring 48 fixed in a recess in the body 16 at the right hand end of the bore 42, as viewed in Figure 1, and having a radially inwardly extending projection 50 extending into the slot 46. The work engaging element 18 is mounted in the outer end of the sleeve 44 and is secured in place by a set screw 52. The outer end of the work engaging element 18 is formed as best illustrated in Figures 1 and 4 to provide the above mentioned flat work engaging surface 20. It will be noted that this surface 20 has a rather short width measured along the axis 14 to facilitate the engagement of cylindrical surfaces on the workpieces which are of limited axial extent.

The sleeve 44 is internally threaded as indicated at 54 for co-operation with an externally threaded shaft 56 which threads into the inner end of the sleeve 44 at the end remote from the work engaging element 18 and extends through the bore 42 and outwardly of the left hand side of the body as viewed in Figure 1. An annular plate 58 is received over the outer end of the shaft 56 and is mounted on the body 16 by means of screws 60. The plate 58 has a recess in its inner face closely fitting a collar 62 integrally formed on the shaft 56. The outer end of the shaft 56 carries a knob 64 secured thereto by a set screw 66. The knob 64 engages the outer surface of the annular plate 58 to prevent axial movement of the shaft 56 in one direction and the collar 62 engages the opposite side of the plate 58 to prevent axial movement of the shaft 56 in the opposite direction.

It will now be appreciated that upon rotation of the knob 64 in one direction the threaded engagement of the shaft 56 and the sleeve 44 will effect longitudinal movement of the sleeve 44 and the work engaging element 18 carried thereby, in one direction longitudinally of the bore 42, or toward or away from the axis 14 and rotation of the knob 64 in the opposite direction will effect movement of the sleeve 44 and work engaging element 18 in the opposite direction.

In the preferred embodiment illustrated, the work engageing element 22 is carried at one end of an arm 68 in which it is secured by a set screw 70 and is of a shape similar to the work engaging element 18. It extends generally at right angles to the arm 68 and has its upper end portion formed as best illustrated in Figures 1 and 2 to provide the above mentioned work engaging surface 24 which also has a narrow width measured along the axis 14 similar to the surface 20. The opposite end of the arm 68 is bifurcated to provide spaced arm portions 72, the outer ends of which have aligned apertures 74. A pivot pin 76 is mounted in the body 16 and is disposed slightly above the bore 42 and extends at right angles to the bore 42 and parallel to the axis 14. The opposite ends of the pivot pin 76 extend through the aligned apertures 74 to pivotally support the arm 68 on the body 16. At the juncture of the arm portions 72 with the main arm 68 is a downwardly extending boss 78 which is provided with an arcuate surface 80 which is engaged as hereinafter described to effect pivotal movement of the arm 68 about the pivot pin 76.

In spaced relation below the bore 42, the body 16 carries a shaft 84, the right hand end of which, as viewed in Figure 1, is rounded for co-operating with the arcuate surface 80 on the boss 78. The shaft, generally indicated at 84, includes an intermediate portion 86 which is externally threaded for co-operation with an internally threaded member 88 which is secured to the body 16 by means of screws 90 extending through a flange 92 on the member 88. The main portion of the threaded member 88 is cylindrical and extends into a cylindrical recess 94 in the body 16. The shaft 84 also includes an outer end portion 96 extending outwardly of the threaded member 88 and carrying a knob 98 secured thereto by a set screw 100. Upon rotation of the knob 98, the shaft 84 is moved axially through the fixed threaded member 88. It will be appreciated that when the knob 98 is rotated in a direction to move the shaft 84 to the left, as viewed in Figure 1, the rounded end of the shaft 84 tends to move away from the arcuate surface 80 of the boss 78 on the arm 68 and the force of gravity acting on the arm 68 causes it to pivot about the pivot pin 76 in a clockwise direction, thereby maintaining the surface 80 in contact with the adjacent rounded end of the shaft 84. Upon return movement of the shaft 84 to the right toward the position illustrated in Figure 1, the engagement of the rounded end of the shaft 84 with the arcuate surface 80 forces the arm 68 in a counterclockwise direction toward the position illustrated in full lines in Figure 1.

In the preferred embodiment illustrated, the jaw elements 18 and 22 are movable to accommodate workpieces of widely varying diameters. The controlling factor limiting minimum diameter is interference between the jaws 18 and 22, and the controlling factor limiting the maximum diameter is the requirement that surface 24 must be tangent to the cylindrical surface for which it is adjusted, it being appreciated that the condition of tangency, with relation to surface 20 of jaw 18 is unaffected by any movement of the jaw 18 away from the axis 14 along a straight line.

The wide range of movement of the jaw 22 of the embodiment illustrated results from the length of the arm 68, the disposition of the pivot pin 74 relative to the surface 24 and the axis 14, and the extent of the surface 24 measured at right angles to the axis 14. It will be appreciated that if either the arm 68 is sufficiently long and/or the surface 24 is of sufficiently great extent measured at right angles to the axis 14, the steady rest could be adjusted for workpieces of widely varying diameters. It is an important feature of the present invention that an optimum range of adjustment for a pivotally mounted jaw element having a surface 24 of a practical extent transversely of the axis 14 and mounted on an arm of a practical length, can be obtained by properly locating pivot point of the arm.

Another way of stating the above mentioned controlling factor of tangency is that for each adjusted position of the element 22 there must be a point on the surface 24 at which a perpendicular to the surface 24 will intersect the axis 14. By locating the axis of pivotal movement of the arm 68 to the same side of a plane including the surface 24 as is the axis 14, and spacing it from the plane a distance greater than that of the axis 14, a construction is provided in which the arm may be moved through two angularly spaced positions in which a given perpendicular to the surface 24 intersects the axis 14. The angular spacing of these positions may be fixed as desired by varying the distance of the pivot point from the plane which, however, must not be so great that at some intermediate position no line from said axis perpendicular to said plane will intersect said surface. The extent of the flat surface in one direction from the given perpendicular controls the maximum angular spacing of the above mentioned angularly spaced positions and the extent of the flat surface in the opposite direction from the given perpendicular controls the usable range of movement beyond one of these angularly spaced positions. As indicated above, movement beyond the other is controlled by interference of the jaw elements 18 and 22. In the preferred embodiment illustrated, one of the above mentioned angularly spaced positions is illustrated in full lines in Figure 1 and the other is illustrated in broken lines and indicated by the reference character 102. The limit to the useful range of movement is indicated by reference character 104.

While only one specific embodiment of the present invention has been illustrated and described in detail, it will be readily appreciated by those skilled in the art that numerous modifications and changes may be made without departing from the spirit of the invention.

What is claimed is:

1. A steady rest for a machine including a worktable and means adjustable for rotatably supporting elongated cylindrical elements of a wide range of sizes for rotation about a fixed axis, said steady rest comprising a body, means for securing said body to said table, a first member having a flat first surface disposed at one side of and parallel to said axis to tangentially engage elements mounted in said machine for rotation about said axis, means mounting said member on said body for adjustment along a line perpendicular to said first surface and intersecting said axis, a second member having a flat second surface adapted to engage said elements in angularly spaced relation relative to the engagement thereof by said first surface of said first member, means mounting said second member on said body for pivotal adjustment about a second axis parallel to said axis and disposed, when said member is in the position in which said second surface is at its closest approach to said first named axis, remotely from a plane including said first named axis and perpendicular to said second surface and at the opposite side of a plane including said first named axis and parallel to said second surface from said second surface so that in two angularly and substantially spaced positions of said second member the same perpendicular to said second surface intersects said first axis, and the spacing of said second axis from said planes being so related to the extent of said second surface that in all positions of said second member intermediate said angularly spaced positions said second surface includes a portion the perpendicular to which intersects said first axis.

2. A steady rest for a machine including a worktable and means adjustable for rotatably supporting elongated cylindrical elements of a wide range of sizes for rotation about a fixed horizontal axis, said steady rest comprising a body, means for securing said body to said table, a first member having a flat first surface vertically disposed at one side of and parallel to said axis to tangentially engage elements mounted in said machine for rotation about said axis, means mounting said member on said body for adjustment along a horizontal line at right angles to said surface and intersecting said axis, a second member having a flat second surface adapted to engage said elements in angularly spaced relation relative to the engagement thereof by said surface of said first member, means mounting said second member on said body for pivotal movement about a second axis parallel to said axis, said second member being movable to a position of closest approach to said axis in which said second surface thereof is disposed substantially horizontally and below said first named axis, said second axis being disposed remotely from a vertical plane including said first axis and at the same side thereof as said first surface of said first member and being disposed substantially above said horizontal line so that in two angularly and substantially spaced positions of said second member the same perpendicular to said second surface intersects said first axis, and the spacing of said second axis from said vertical plane and from said horizontal line being so related to the extent of said second surface transversely of said first axis that in all positions of said second member intermediate said angularly spaced positions thereof said second surface includes a portion the perpendicular to which intersects said first axis.

BENEDICT WELTE.
OLNEY J. ABBOTT, Jr.

REFERENCES CITED

The following references are of record in the file of this patent:

UNITED STATES PATENTS

| Number | Name | Date |
| --- | --- | --- |
| 1,163,041 | Shearer | Dec. 7, 1915 |
| 1,867,112 | Steiner et al. | July 12, 1932 |
| 2,286,620 | Hollengreen | June 16, 1942 |